United States Patent [19]
Whitcher et al.

[11] Patent Number: 6,144,552
[45] Date of Patent: Nov. 7, 2000

[54] HANDHELD COMPUTER SYSTEM

[75] Inventors: Paul M. Whitcher, Hopkinton; Robert P. Wierzbicki, Worcester; Maurice Valois, Spencer; David R. Cultice, Marlboro, all of Mass.

[73] Assignee: EMC Corporation, Hopkinton, Mass.

[21] Appl. No.: 09/299,696

[22] Filed: Apr. 26, 1999

[51] Int. Cl.[7] .......................... H05K 5/00; G02F 1/1333; G02F 1/3335
[52] U.S. Cl. .......................... 361/681; 361/682; 345/905; 248/917
[58] Field of Search .................. 361/680–683, 361/686, 724–727; 345/169, 905; 248/917; 40/530; 364/708.1

[56] References Cited

U.S. PATENT DOCUMENTS

| | | | |
|---|---|---|---|
| 5,002,368 | 3/1991 | Anglin | 350/334 |
| 5,196,993 | 3/1993 | Herron et al. | 361/393 |
| 5,363,227 | 11/1994 | Ichikawa et al. | 359/83 |
| 5,363,276 | 11/1994 | Crockett | 361/752 |
| 5,479,285 | 12/1995 | Burke | 359/83 |
| 5,550,712 | 8/1996 | Crockett | 361/752 |
| 5,613,223 | 3/1997 | Ross et al. | 455/89 |
| 5,831,816 | 11/1998 | Johns et al. | 361/681 |

FOREIGN PATENT DOCUMENTS 11-7327  1/1999  Japan .............................. G05D 23/19

*Primary Examiner*—Gerald Tolin
*Assistant Examiner*—Anatoly Vortman
*Attorney, Agent, or Firm*—Kriegsman & Kriegsman

[57] ABSTRACT

A handheld computer system for data collection tasks includes a front housing having a first set of spaced apart ribs and a rear housing having a second set of spaced apart ribs. A logic printed circuit board is affixed to the rear housing and serves as the motherboard for the computer system. A digital camera electrically connected to the logic printed circuit board is affixed to the rear housing and provides the computer system with bar code recognition and monochrome imaging capabilities. A 2.4 Ghertz, spread spectrum radio frequency transmitter electrically connected to the logic printed circuit board is affixed to the rear housing and provides the computer system with data transmission capabilities. A screen assembly is disposed between the front housing and the rear housing and includes a frame assembly, a screen module disposed within the frame assembly, a plurality of soft, deformable, shock mounts disposed over the frame assembly and the screen module, and an electrical reflective gasket mounted on the frame assembly. The screen assembly is disposed between the front housing and the rear housing so that the plurality of shock mounts abut against the first and second sets of spaced apart ribs. Upon the application of physical shock onto the handheld computer system, the screen assembly is temporarily displaced relative to the front and rear housing so that at least one of the plurality of shock mounts deform into the space between at least one consecutive pair of the first set of spaced apart ribs and between at least one consecutive pair of the second set of spaced apart ribs.

10 Claims, 7 Drawing Sheets

HANDHELD COMPUTER SYSTEM

BACKGROUND OF THE INVENTION

The present invention relates generally to computer systems and more particularly to handheld computer systems.

Various models of handheld computer systems, also commonly referred to as handheld computers, are sold by Data General Corporation of Westboro, Mass. under the name DATAGENIE.

One model of the DATAGENIE handheld computer which is sold by Data General Corporation of Westboro, Massachusetts is designed for application-specific data collection tasks, such as keeping records of inventory in the workplace.

Another model of the DATAGENIE handheld computer which is sold by Data General Corporation of Westboro, Mass. is designed for health care data collection tasks, such as monitoring the vital signs, test results and medication allocation for patients. As can be appreciated, this type of handheld computer has numerous clinical applications in the health care industry, such as ambulatory care, emergency care, in-home care, patient registration, patient diagnostics and medication management.

Handheld computers of the type described above are typically small in size, having a height of approximately 7.5 inches and a width of approximately 3.0 inches. Handheld computers of the type described above are also typically lightweight, having a weight in the range of approximately 14.0 ounces to approximately 15.0 ounces. In addition, handheld computers of the type described above are typically rugged in construction, having the capability of withstanding the physical shock of a four foot drop onto a concrete floor. As can be appreciated, handheld computers which are lightweight, small and rugged are highly portable devices which are capable of being used in a large range of potential applications, which is highly desirable.

Handheld computers of the type described above typically comprise a ¼ VGA monochrome screen, a central processing unit (CPU), approximately 2 Megabytes of flash memory, a nickel metal hydride (NIMH) rechargeable battery and a wireless spread-spectrum radio.

Although well known and widely used in commerce, handheld computers of the type described above experience two notable drawbacks.

As a first drawback, it has been found that the ¼ VGA monochrome screen is not desirable in certain applications. Specifically, it has been found that the ¼ VGA monochrome computer screen is relatively small, thereby making it difficult for the operator to read data from the handheld computer. In addition, it has been found that the inability of the computer screen to produce color images limits the range of potential uses for the computer system.

As a second drawback, it has been found that the computer system is incapable of performing certain data collection tasks which are desirable in particular applications. In order to increase its range of possible data collection tasks, handheld computers of the type described above require the installation of additional electrical components. Installing additional electrical components significantly increases the overall size and weight of the handheld computer, thereby rendering the computer less portable, which is highly undesirable. Furthermore, it should be noted that increasing the weight of the handheld computer renders the device less rugged and durable. Specifically, the increase in weight increases the amount of physical shock absorbed on the handheld computer when dropped onto a hard surface, such as a concrete floor. In particular, it has been found that a considerable increase in the weight of the computer imparts too large a level of physical shock on the computer screen when the computer is dropped. Disposing a high level of physical shock on the computer screen when the computer is dropped causes the computer screen to flex significantly which, in turn, causes the computer screen to crack, thereby rendering it inoperable.

It is an object of this invention to provide a new and improved handheld computer system.

It is another object of this invention to provide a handheld computer system which has a large range of potential applications.

It is yet another object of this invention to provide a handheld computer system as described above which is small.

It is still another object of this invention to provide a handheld computer system as described above which is lightweight.

It is another object of this invention to provide a handheld computer system as described above which rugged and durable.

It is yet another object of this invention to provide a handheld computer system as described above which comprises a computer screen which is relatively large and which produces color images.

It is still another object of this invention to provide a handheld computer system which is designed to withstand a significant level of physical shock.

It is another object of this invention to provide a handheld computer system which is easy to use, can be readily manufactured and has a limited number of parts.

SUMMARY OF THE INVENTION

Accordingly, as one feature of the present invention, there is provided a handheld computer system comprising a housing having a plurality of spaced apart ribs, and a screen assembly disposed within said housing, said screen assembly comprising, a frame assembly, a screen module disposed within said frame assembly, and a plurality of shock mounts disposed over said frame assembly and said screen module, wherein said screen assembly is disposed within said housing so that said plurality of shock mounts abuts against the plurality of spaced apart ribs.

As another feature of the present invention, there is provided a handheld computer system comprising a housing, a logic printed circuit board disposed within said housing, a screen module electrically connected to said logic printed circuit board, a digital camera electrically connected to said logic printed circuit board, and a transmitter electrically connected to said logic printed circuit board.

Various other features and advantages will appear from the description to follow. In the description, reference is made to the accompanying drawings which form a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 2:
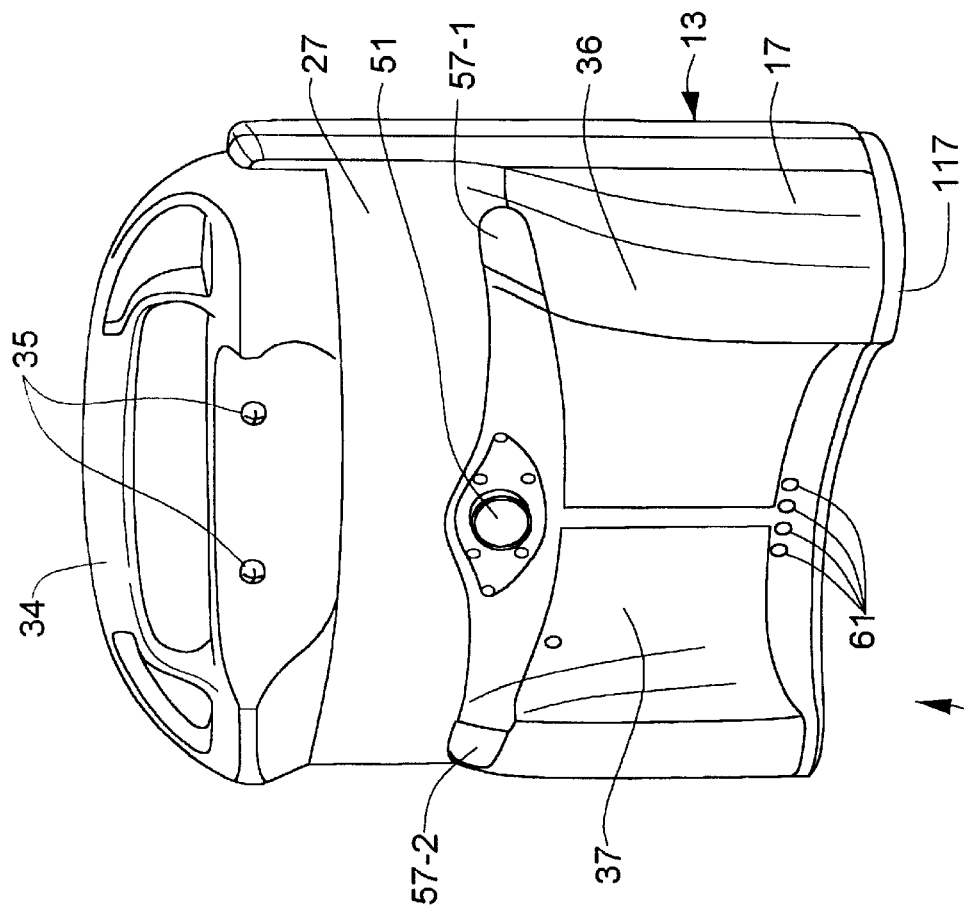
FIG. 2 is a rear perspective view of the handheld computer system of FIG. 1.
Figure 1:
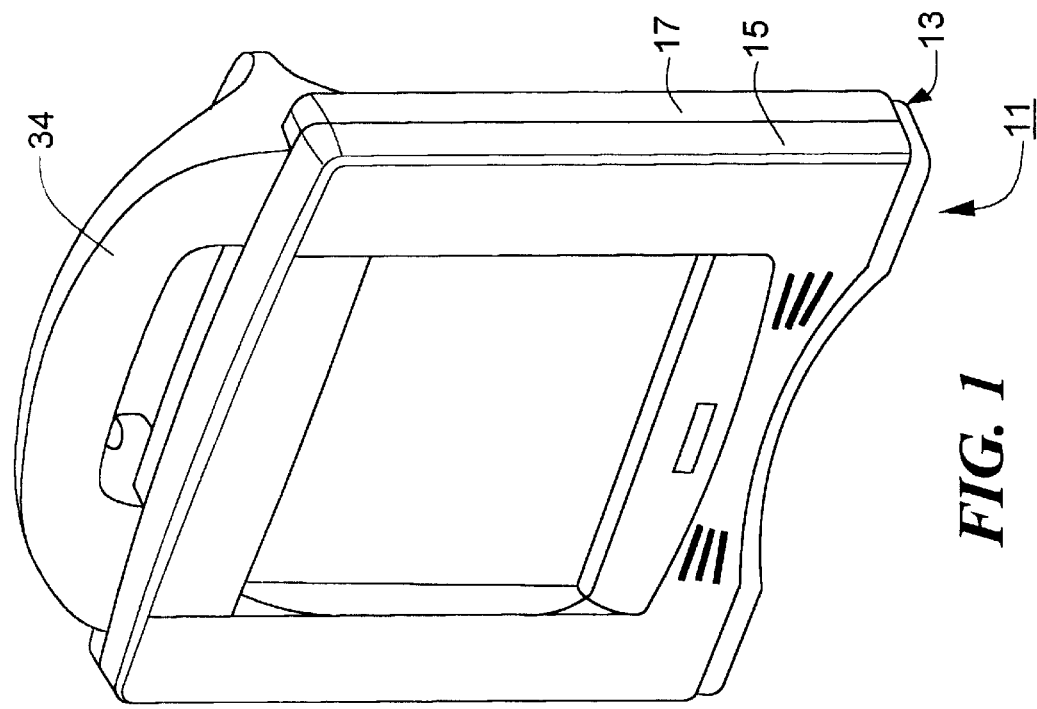
FIG. 1 is a front perspective view of a handheld computer system constructed according to the teachings of the present invention.
Figure 3:
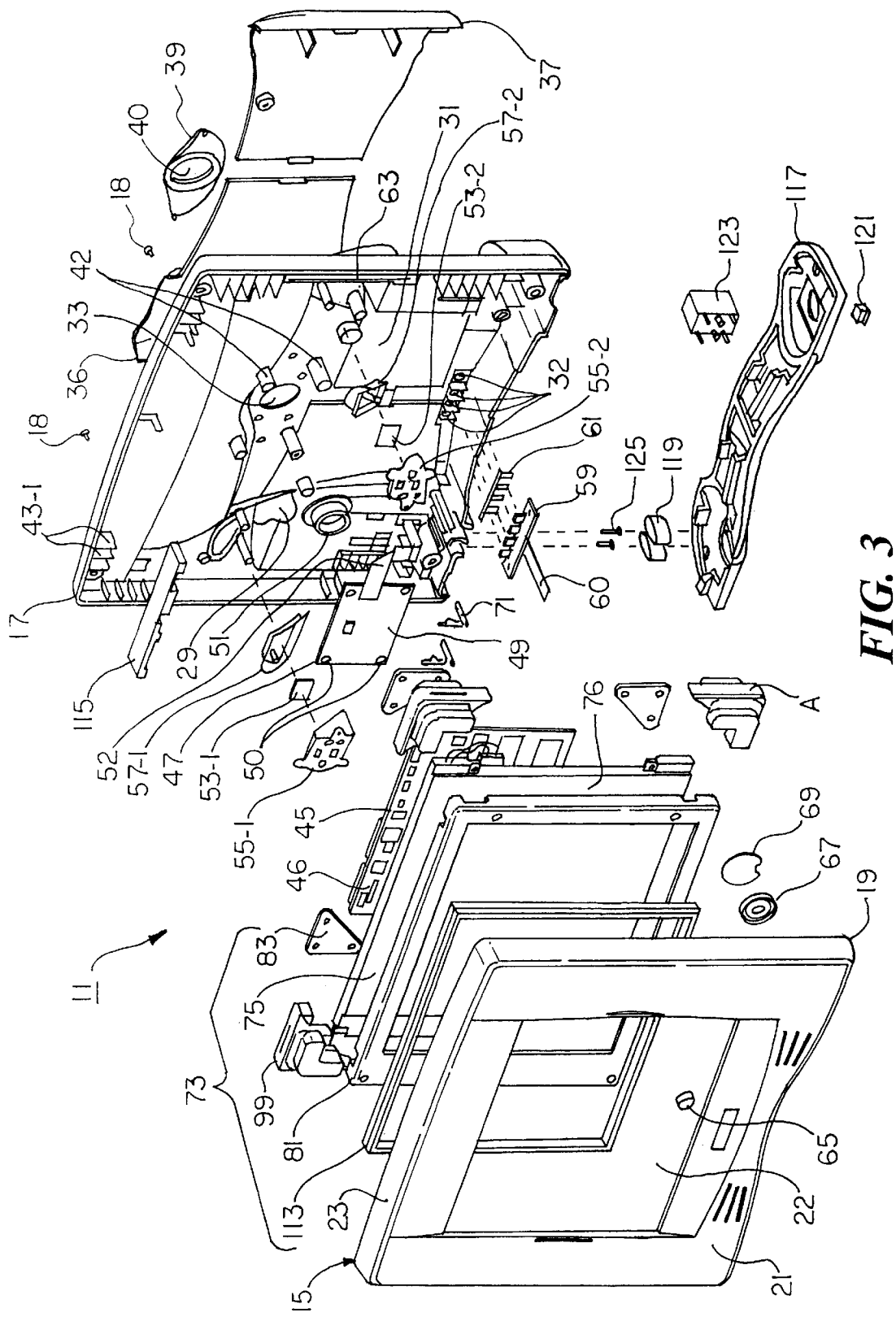
FIG. 3 is an exploded, front perspective view of the handheld computer system of FIG. 1, the handheld computer system being shown with the handle removed.

Referring now to the drawings, there is shown in FIGS. 1–3, a handheld computer system constructed according to the teachings of the present invention, the handheld computer system being identified by reference numeral 11.

Handheld computer system 11 is a portable computer which can be used for data collection tasks. Preferably, handheld computer system 11 is a WiiN-PAD Point-of-Care computer which is manufactured for sale by Data General Corporation of Westboro, Mass. and which is designed for clinical health care applications, such as acute patient care, ambulatory, emergency and in-home care, patient registration and medication management, as will be described further in detail below.

Handheld computer system 11 comprises a generally rectangular housing 13 which is constructed out of a rigid and durable material such as plastic. Housing 13 comprises a front housing 15 and a rear housing 17 which are affixed to one another by screws 18, or other similar attachment means, to make handheld computer system 11 a unitary device.

Front housing 15 is generally rectangular and includes an inner surface 19, an outer surface 21 and a central opening 22. Front housing 15 is also shaped to include an inwardly protruding flange 23 formed along the outer periphery of inner surface 19 and a plurality of inwardly protruding, threaded mounting posts 24 which are formed on inner surface 19. Screws 18 project through rear housing 17 and into threaded mounting posts 24 to affix front housing 15 and rear housing 17 together.

Rear housing 17 is generally rectangular and includes an inner surface 25, an outer surface 27, a battery receiving opening 29, a printed circuit board (PCB) access opening 31, a plurality of Infrared (IrDA) tranceiver receiving openings 32 and a camera receiving opening 33.

A handle 34 is mounted on outer surface 27 of rear housing 17 by screws 35, or other similar attachment means. A battery cover 36 is also removably mounted on outer surface 27 of rear housing 17 over battery receiving opening 29. Similarly, a PCB cover 37 is removably mounted on outer surface 27 of rear housing 17 over PCB access opening 31. In addition, a transparent camera cover 39 having a cental circular opening 40 is mounted on outer surface 27 of rear housing 17 so that central circular opening 40 is aligned over camera receiving opening 33.

Rear housing 17 is also shaped to include an inwardly protruding flange 41 formed along the outer periphery of inner surface 25 and a plurality of inwardly protruding, threaded mounting posts 42 which are formed on inner surface 25.

Figure 4:
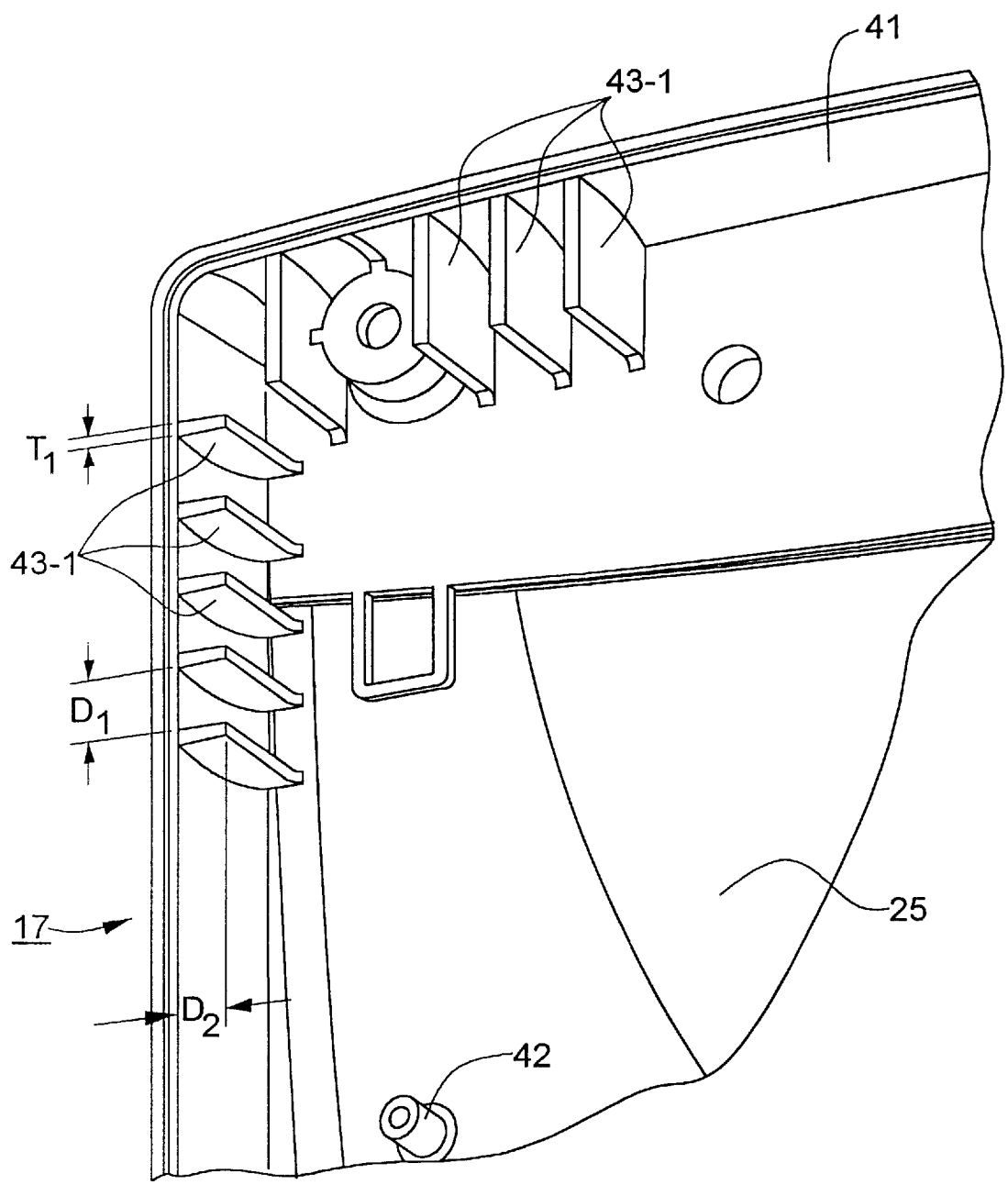
FIG. 4 is an enlarged, fragmentary, front perspective view of the rear housing shown in FIG. 3.
Figure 5:
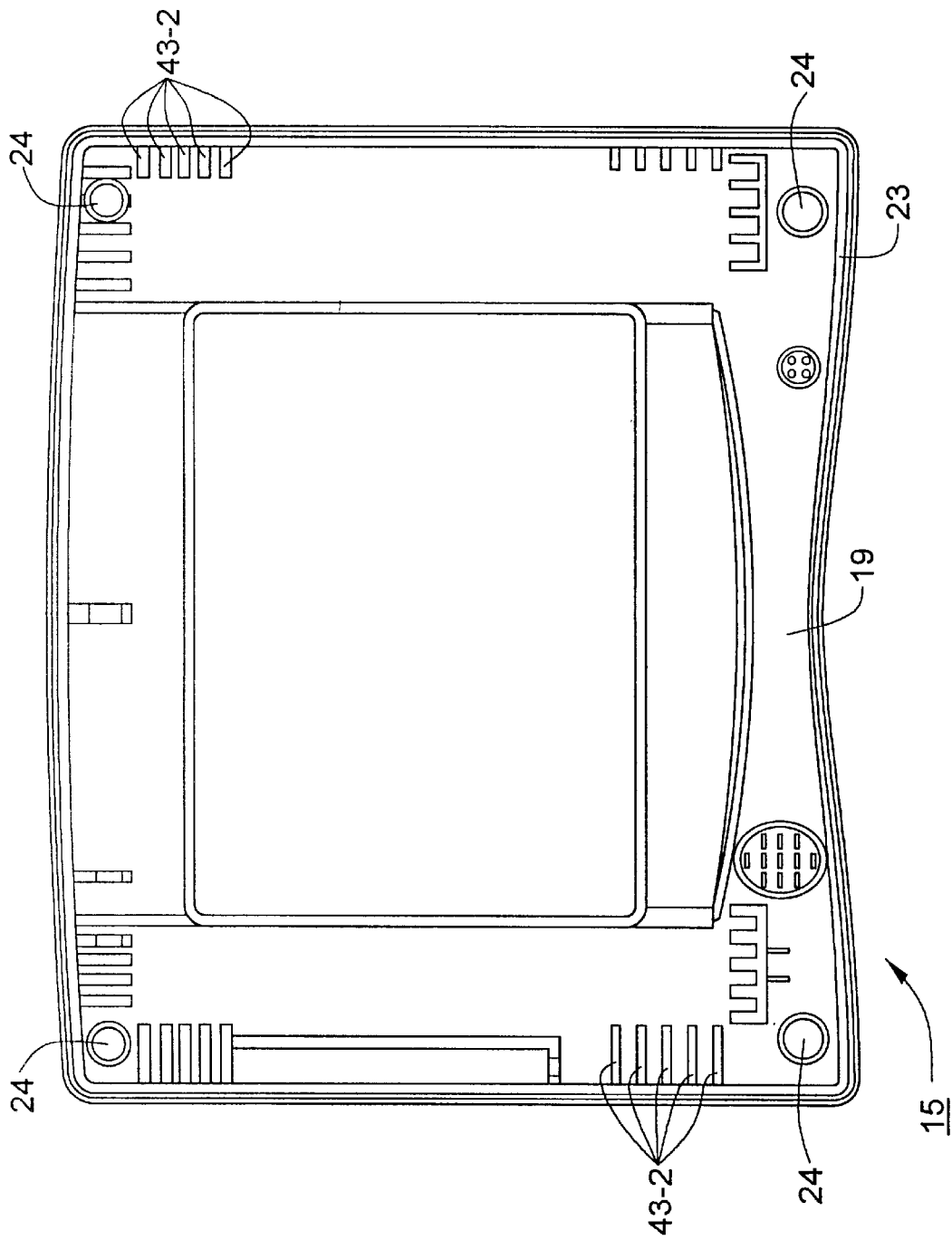
FIG. 5 is a rear plan view of the front housing shown in FIG. 3.

Rear housing 17 is shaped to include a set of plurality of inwardly protruding ribs 43-1, or fins, which are formed along a portion of inner surface 25, as shown in FIG. 4. Similarly, front housing 15 is shaped to include a set of inwardly protruding ribs 43-2, or fins, which are formed along a portion of inner surface 19, as shown in FIG. 5. It should be noted that the configuration of ribs 43-1 on rear housing 17 mirrors the configuration of ribs 43-2 on front housing 15, thereby aligning each of ribs 43-1 on rear housing 17 with an associated rib 43-2 on front housing 15 when front housing 15 and rear housing 17 are affixed together.

Ribs 43 are disposed within housing 13 so that adjacent ribs 43 are spaced apart a distance $D_1$ of approximately 0.25 inches, as shown in FIG. 4, each rib 43 having a thickness $T_1$ of approximately 0.0462 inches. In addition, ribs 43-1 and 43-2 are disposed to protrude in from flanges 41 and 23, respectively, a minimum distance $D_2$ of approximately 0.18 inches, as shown in FIG. 4. It should be noted that ribs 43-1 and 43-2 may protrude in from flanges 41 and 23, respectively, more than minimum distance $D_2$ to accommodate the placement of various components of computer system 11 within housing 13 without departing from the spirit of the present invention.

A logic printed circuit board (PCB) 45 is fixedly mounted onto inner surface 25 of rear housing 17 and serves as the motherboard for computer system 11. Logic PCB 45 is mounted onto inner surface 25 of rear housing 17 over PCB access opening 31, thereby enabling most of the electrical components mounted on logic PCB 45 to be accessed by removing PCB cover 37.

A plurality of screws (not shown) are disposed through preformed holes 46 in logic PCB 45 and into threaded mounting posts 42 so as to fixedly mount logic PCB 45 onto inner surface 25 of rear housing 17. However, it is to be understood that logic PCB 45 could be fixedly mounted onto inner surface 25 of rear housing 17 by alternative means, such as by an adhesive, without departing from the spirit of the present invention.

Preferably, logic PCB 45 provides 16 MB of main memory (DRAM), which can be expanded up to 64 MB, and 24 MB of FLASH file system (non-volatile) memory, which can be expanded up to 72 MB.

Furthermore, it is preferred that logic PCB 45 be programmed to include Microsoft Windows CE 2.1 operating system. As can be appreciated, such an operating system enables handheld computer system 11 to be highly portable, to launch application programs from the FLASH file system memory and to provide an on-screen taskbar for selecting menu items.

A digital camera 47, fixedly mounted onto inner surface 25 of rear housing 17, provides computer system 11 with bar code recognition and monochrome imaging capabilities. Digital camera 47 comprises a printed circuit board (PCB) 49, a camera lens 51 mounted on PCB 49 and a flat electrical cable 52 which electrically connects printed circuit board 49 to logic PCB 45. Digital camera 47 is mounted onto inner surface 25 of rear housing 17 so that camera lens 51 protrudes through camera receiving opening 33 and opening 40 in camera cover 39, as shown in FIG. 2.

A plurality of screws (not shown) are disposed through preformed holes 50 in PCB 49 and into threaded mounting posts 42 so as to fixedly mount PCB 49 onto inner surface 25 of rear housing 17. However, it is to be understood that PCB 49 could be fixedly mounted onto inner surface 25 of rear housing 17 by alternative means, such as by an adhesive, without departing from the spirit of the present invention.

A pair of switches 53-1 and 53-2, each mounted on an associated switch support 55-1 and 55-2, respectively, are electrically connected to logic PCB 45. A pair of shutter buttons 57-1 and 57-2 are mechanically coupled to switches 53-1 and 53-2, respectively, and project partially through rear housing 17. As can be appreciated, depression of either one of shutter buttons 57 temporarily changes the switching state of switches 53 which, in turn, causes logic PCB 45 to operate digital camera 47, such as for bar code recognition and/or imaging tasks.

An infrared (IrDA) transceiver 59 is electrically connected to logic PCB 45 by a flat electrical cable 60. Infrared transceiver 59 is preferably a 1.0 compliant transceiver capable of 115 Kbps and provides a communication link between handheld computer system 11 and additional computer devices, such as a computer printer or a host computer system. An infrared lens 61 is mounted on infrared transceiver 59 and is disposed to project partially through infrared transceiver receiving openings 32 in rear housing 17.

Handheld computer system 11 is equipped to include a 2.4 Ghertz, spread spectrum, radio frequency (RF) transmitter 63 which is mounted on inner surface 25 of rear housing 17 and which is electrically connected to logic PCB 45 by electrical wires (not shown). In use, RF transmitter 63 enables data recorded by handheld computer system 11 to be transmitted to another computer, such as a main computer. It should be noted that handheld computer system 11 is not limited to RF transmitter 63 as a means for linking handheld computer system 11 with other computer systems. Rather, it is to be understood that RF transmitter 63 could be replaced with alternative communication options, such as a 56 Kb modem or a 10 bT LAN, without departing from the spirit of the present invention.

A microphone 65 and a speaker 67 are electrically connected to logic PCB 45 by electrical wires (not shown). Microphone 65 is mounted on inner surface 19 of front housing 15 and serves to produce alternating-current electrical impulses in response to sound waves. Speaker 67 is similarly mounted on inner surface 19 of front housing 15 and serves to produce sound waves in response to electrical impulses. A speaker cap 67 is mounted on speaker 65. As can be appreciated, microphone 65 and speaker 67 enable audio data to be entered into and retrieved from handheld computer system 11.

A pair of battery springs 71 are electrically connected to logic PCB 45. Battery springs 71 are sized and shaped to electrically and mechanically connect with a battery (not shown) which is removably disposed through battery receiving opening 29 in rear housing 17. Preferably the battery is a rechargeable, lithium ion battery and serves to provide the power for handheld computer system 11.

Handheld computer system 11 further comprises a screen assembly 73 disposed within housing 13. As can be appreciated, screen assembly 73 is the heaviest and most fragile component in computer system 11, computer system 11 having a total weight of approximately 2.8 lbs. As will described in detail below, screen assembly 73 is specifically constructed to enable handheld computer system 11 to withstand the physical shock of a five foot drop onto a concrete floor in all axes (approximately 450 gs of force), which is a principal object of the present invention.

Screen assembly 73 comprises a screen module, or monitor, 75 for displaying particular data collected by handheld computer system 11. Screen module 75 is preferably an eight-inch diagonal, DSTN, LCD color monitor having 640 by 480 pixel resolution (full VGA), 256 colors and CCFL backlight. As can be appreciated, screen module 75 provides full vivid color display, even in dimly lit environments, which is an object of the present invention. Screen module 75 comprises a computer screen 76 and a plurality of mounting holes 77. Preferably, computer screen 76 has touch screen data implementation capabilities.

An frame assembly 79 constructed out of a flat and rigid metal, such as aluminum, is affixed to screen module 75. As can be appreciated, frame assembly 79 stiffens screen module 75, thereby making screen module 75 less susceptible to bending and breaking, which is a principal object of the present invention.

Figure 7:
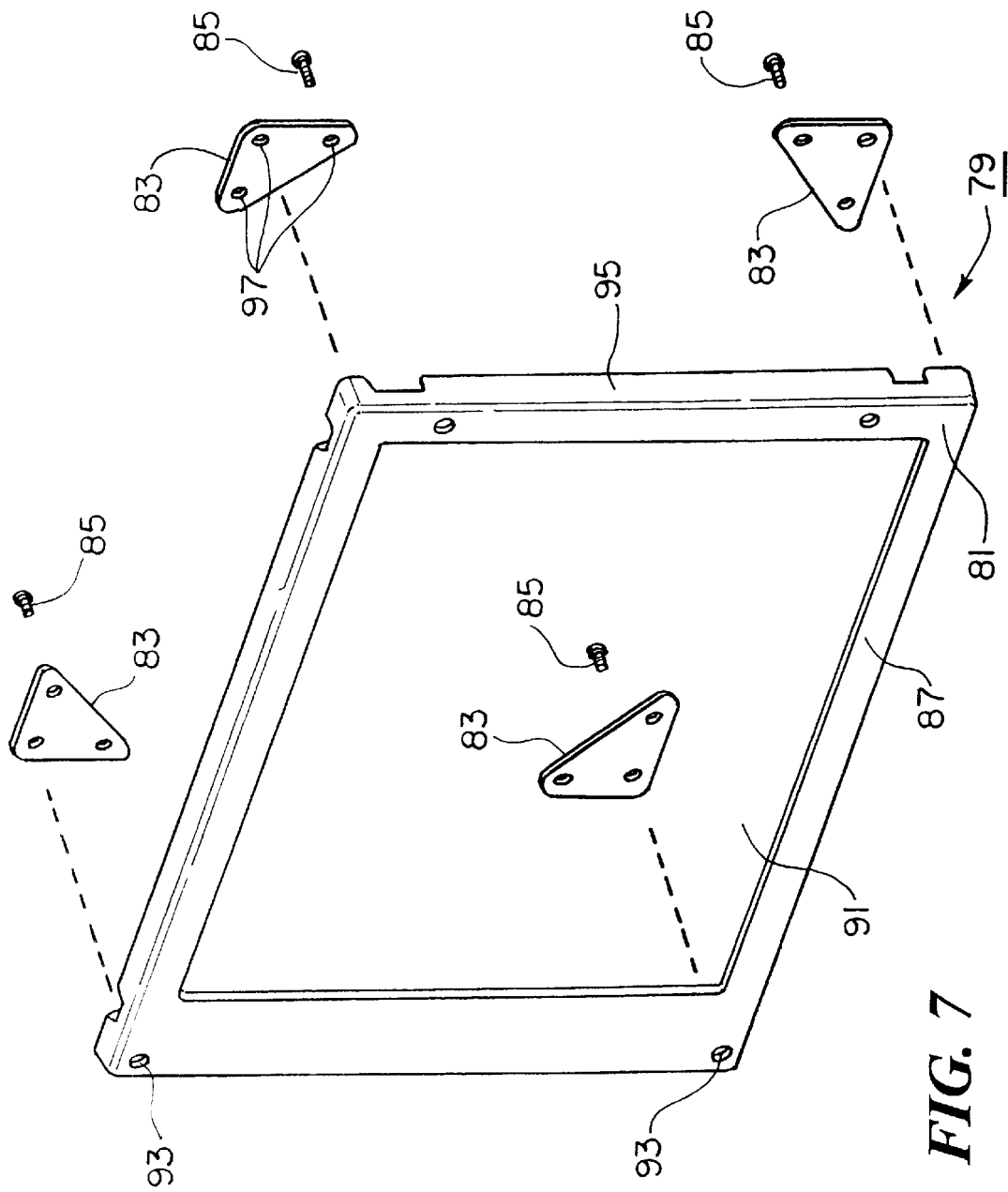
FIG. 7 is a top perspective view of the frame assembly shown in FIG. 3.

Referring now to FIG. 7, frame assembly 79 comprises a front frame 81, a plurality of frame corners 83 and a plurality of pins 85.

Front frame 81 is generally rectangular and comprises an outer surface 87, an inner surface 89, a central rectangular opening 91 and a plurality of pin receiving openings 93. Front frame 81 further comprises a rearwardly extending flange 95 which renders front frame 81 generally U-shaped in lateral cross-section. Front frame 81 is sized and shaped so that screen module 75 can be disposed against inner surface 89 of front frame 81. It should be noted that flange 95 helps retain screen module 75 against inner surface 89 of front frame 81 with computer screen 76 aligned within central rectangular opening 91.

Each of frame corners 83 are generally triangular and include spaced apart, pin receiving openings 97.

As can be appreciated, with screen module 75 disposed against inner surface 89 and within flange 95, plurality of pins 85 pass through pin receiving openings 97 in frame corners 83, through mounting holes 77 in screen module 75 and into pin receiving openings 93 in front frame 81. As such, screen module 75 is wedged tightly between front frame 81 and frame corners 83 so as to limit the amount of flexion of screen module 75, which is desirable.

It should be noted that frame assembly 79 is not limited to the use of pins 85 to secure screen module 75 between front frame 81 and frame corners 83. Rather, frame assembly 79 could comprise alternative types of attachment devices, such as bolts or screws, in place of pins 85 without departing from the spirit of the present invention.

It should also be noted that frame assembly 79 is not limited to the use of front frame 81 and plurality of frame corners 83 as means for stiffening screen module 75. Rather, frame assembly 79 could comprise alternative devices for stiffening screen module 75, such as a one-piece metal frame or a pair of metal frames affixed to one another, without departing from the spirit of the present invention.

Figure 6:
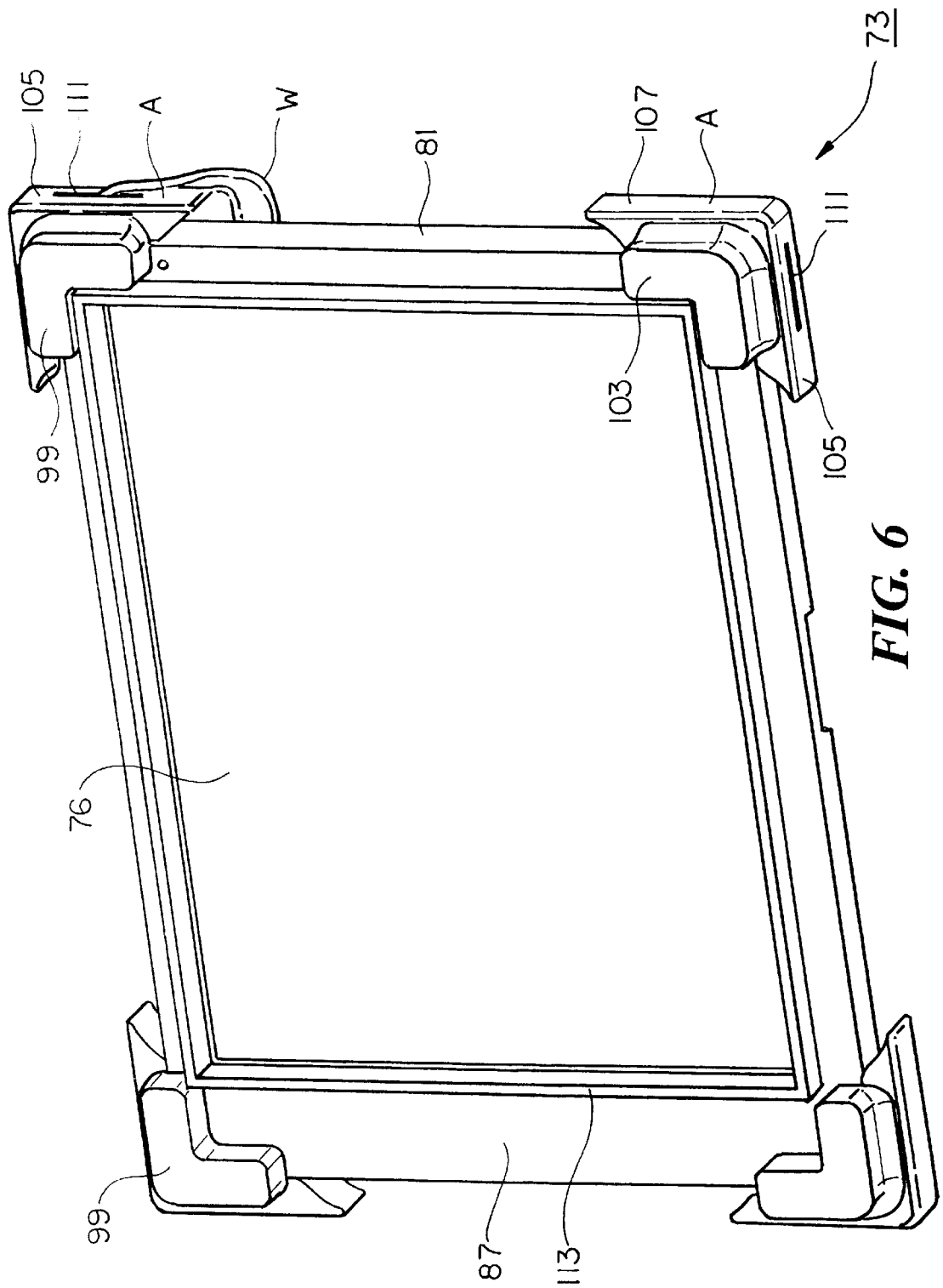
FIG. 6 is a bottom perspective view of the screen assembly shown in FIG. 3.

A plurality of shock mounts 99 are disposed over frame assembly 79 and screen module 75, as shown in FIG. 6. Shock mounts 99 serve to absorb physical shock imparted onto frame assembly 79 and, more particularly, onto screen module 75. Shock mounts 99 absorb physical shock by converting the energy created by the physical shock into limited, shock absorbed movement of frame assembly 79 and screen module 75 within housing 13, which is desirable.

Each shock mount 99 is constructed of a soft, deformable, polyurethane-based compound having a durometer, or softness, in the range from approximately 10 durometer to approximately 20 durometer. Constructed as such, each shock mount 99 is capable of absorbing approximately 192 gs of physical shock.

Figures 8, 9:
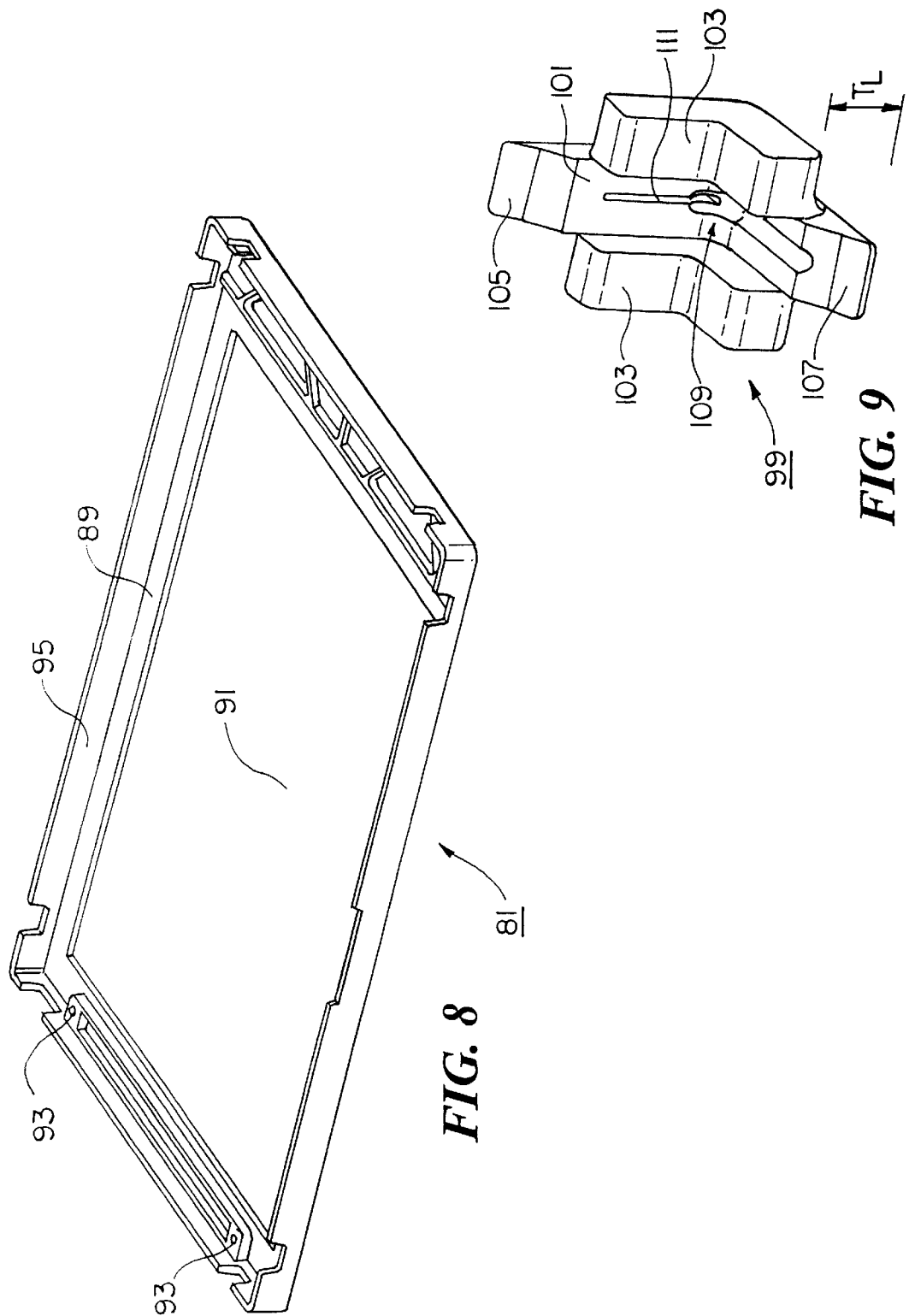
FIG. 8 is a rear perspective view of the front frame shown in FIG. 7.
FIG. 9 is a perspective view of one of the shock mounts shown in FIG. 3.

Each shock mount 99 is shaped to include a central, generally L-shaped member 101 and a pair of generally L-shaped sidewalls 103 which are integrally formed onto member 101, as shown in FIG. 9. Central, generally L-shaped member 101 comprises a first leg 105 and a second leg 107, each of legs 105 and 107 having an equal surface area A. When compressed and under load, surface area A has a value of approximately 3.25 inches which can be calculated using the following formula:

$$A = \frac{k \cdot T_L}{Ec},$$

where k equals the stiffness of each shock mount 99 in lbs/in, $T_L$ equals the thickness of each of legs 105 and 107 in inches, and $E_C$ equals the compression modulus for the material used to manufacture each shock mount 99 in lbs/in². The stiffness value k is used to determine the durometer value for shock mounts 99 and can be calculated using the following formula:

$$k = \frac{w \cdot (Wn)^2}{g},$$

where w equals the weight of handheld computer system 11, g equals the gravitational force and $W_N$ equals the energy absorbtion capability of each shock mount 99.

Sidewalls 103 of each shock mount 99 are integrally formed onto central member 101 so as to define a generally L-shaped channel 109 therebetween. As shown in FIG. 6, shock mounts 99 are mounted on frame assembly 79 and screen module 75 so that frame assembly 79 and screen module 75 are positioned within channel 109 and between sidewalls 103. It should be noted that leg 105 of central, generally L-shaped member 101 preferably includes an elongated slot 111 formed therein which enables electrical wires W, or other similar items, to pass through shock mounts 99.

In use, screen assembly 73 is disposed within housing 13 so that legs 105 and 107 of shock mounts 99 abut against ribs 43. Upon the application of physical shock onto handheld computer system 11, such as by a five foot drop onto concrete, screen assembly 73 is temporarily displaced within housing 13 so that shock mounts 99 deform approximately 0.30 inches into the space between adjacent, or consecutive, ribs 43. As such, shock mounts 99 protect computer system 11 by converting the energy introduced by the application of physical shock into shock-absorbed movement within housing 13. Once the application of physical shock has been removed from computer system 11, shock mounts 99 return to their original shape, thereby returning screen assembly 73 to its original position within housing 13. As can be appreciated, shock mounts 99 act as shock absorbers upon movement of screen assembly 73 within housing 13, which is highly desirable.

It should be noted that the particular distance $D_1$, of approximately 0.25 inches, between adjacent, or consecutive, ribs 43 in housing 13 is critical for the present invention. Specifically, if the distance between consecutive ribs 43 is considerably greater than 0.25 inches, ribs 43 do not provide enough resistance for shock mounts 99. As a consequence, shock mounts 99 will over-deform between consecutive ribs 43 and therefore will not properly absorb the physical shock energy. To the contrary, if the distance between consecutive ribs 43 is considerably less than 0.25 inches, ribs 43 will provide too large a level of resistance for shock mounts 99. As a consequence, ribs 43 will not be able to deform between consecutive ribs 43 and therefore will not absorb the physical shock energy.

A gasket 113 is mounted on front surface 87 of front frame 81 around computer screen 76. Gasket 113 is sized and shaped to abut tightly against inner surface 19 of front housing 15 so as to prevent air from passing between front housing 15 and front frame 81 and consequently, into the interior of handheld computer system 11. Gasket 113 is constructed of a rubber material coated in an electrical shield, preferably silver. Mechanically, the rubber material in gasket 113 provides screen assembly 73 with shock protection from physical shock imparted in the direction orthogonal to the plane of computer screen 76. Electrically, the electrical shield which coats gasket 113 reflects up to approximately 15,000 volts of RF energy discharged by computer screen 76 during use. As such, gasket 113 serves to shield electronic components within computer system 11 from electrostatic discharge by absorbing the heavy voltage produced by computer screen 76.

Handheld computer system 11 also comprises a display inverter 115, a foot 117 constructed of a soft material, such as rubber, a pair of oval tubes 119, a dust cap 121, a jack 123, and a pair of power pins 125.

The embodiment shown in the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A handheld computer system comprising:
   (a) a housing comprising a front housing having a first set of spaced apart ribs and a rear housing having a second set of spaced apart ribs; and
   (b) a screen assembly disposed within said housing, said screen assembly comprising,
      i) a frame assembly,
      ii) a screen module disposed within said frame assembly, and
      iii) a plurality of shock mounts disposed over said frame assembly and said screen module,
   (c) wherein said screen assembly is disposed within said each of the said plurality of shock mounts abuts against the first and second sets of the spaced apart ribs.

2. The handheld computer system as claimed in claim 1 wherein each of said plurality of shock mounts is manufactured of a soft, deformable material.

3. The handheld computer system as claimed in claim 2 wherein said screen assembly further comprises a gasket mounted on said frame assembly.

4. The handheld computer system as claimed in claim 3 wherein each of said plurality of shock mounts has a durometer in the range from approximately 10 durometer to approximately 20 durometer.

5. The handheld computer system as claimed in claim 4 wherein said frame assembly comprises a front frame and a plurality of frame corners for stiffening said screen module.

6. The handheld computer system as claimed in claim 5 wherein the distance between consecutive ribs in said housing is approximately 0.25 inches.

7. The handheld computer system as claimed in claim 6 wherein said gasket is constructed of a rubber material coated in an electrical shield.

8. The handheld computer system as claimed in claim 7 wherein said screen module includes a computer screen.

9. The handheld computer system as claimed in claim 8 wherein said front frame comprises a central opening.

10. The handheld computer system as claim in claim 9 wherein said screen module is disposed within said frame assembly so that the computer screen is aligned within the central opening in said front frame.

* * * * *

UNITED STATES PATENT AND TRADEMARK OFFICE
CERTIFICATE OF CORRECTION

PATENT NO.   : 6,144,552
DATED        : November 7, 2000
INVENTOR(S)  : Paul M. Whitcher, Robert P. Wierzbicki, Maurice Valois, and David R. Cultice It is certified that error appears in the above-identified patent and that said Letters Patent are hereby corrected as shown below:

On column 8, lines 52-53, after "disposed within said" and before "each of the" please insert --housing so that--.

Signed and Sealed this

Eighth Day of May, 2001

*Attest:*

NICHOLAS P. GODICI

*Attesting Officer*   Acting Director of the United States Patent and Trademark Office